(12) United States Patent
Ottliczky et al.

(10) Patent No.: US 10,527,185 B2
(45) Date of Patent: Jan. 7, 2020

(54) VALVE ASSEMBLY

(71) Applicant: BUERKERT WERKE GMBH & CO. KG, Ingelfingen (DE)

(72) Inventors: Martin Ottliczky, Forchtenberg (DE); Harry Stoesser, Mueglitztal (DE); Heiko Engler, Forchtenberg (DE)

(73) Assignee: BUERKERT WERKE GMBH & CO. KG., Ingelfingen (DE)

( * ) Notice: Subject to any disclaimer, the term of this patent is extended or adjusted under 35 U.S.C. 154(b) by 180 days.

(21) Appl. No.: 15/788,875

(22) Filed: Oct. 20, 2017

(65) Prior Publication Data

US 2018/0112787 A1 Apr. 26, 2018

(30) Foreign Application Priority Data

Oct. 20, 2016 (DE) .......................... 10 2016 120 027

(51) Int. Cl.
*F16K 27/00* (2006.01)
*F15B 13/08* (2006.01)
*F16K 11/00* (2006.01)

(52) U.S. Cl.
CPC ........ *F16K 27/003* (2013.01); *F15B 13/0807* (2013.01); *F15B 13/0817* (2013.01); *F16K 11/00* (2013.01)

(58) Field of Classification Search
USPC ....................................................... 137/884
See application file for complete search history.

(56) References Cited

U.S. PATENT DOCUMENTS

| | | | | |
|---|---|---|---|---|
| 5,127,440 A | * | 7/1992 | Maas | B60T 8/3675 137/560 |
| 5,184,647 A | * | 2/1993 | Goedecke | F15B 13/0839 137/884 |
| 5,348,047 A | * | 9/1994 | Stoll | F15B 13/0814 137/554 |
| 5,765,589 A | | 6/1998 | Stoll et al. | |
| 5,915,409 A | * | 6/1999 | Kaneko | F15B 13/0814 137/270 |
| 6,053,198 A | * | 4/2000 | Atkin | F15B 13/0807 137/271 |
| 6,148,855 A | * | 11/2000 | Rauner | B60T 8/3675 137/560 |

(Continued)

FOREIGN PATENT DOCUMENTS

| | | |
|---|---|---|
| DE | 19526459 A1 | 1/1997 |
| DE | 60127985 T2 | 8/2007 |
| WO | 2007/118487 A1 | 10/2007 |

*Primary Examiner* — John Fox
(74) *Attorney, Agent, or Firm* — McNees Wallace & Nurick LLC

(57) ABSTRACT

A valve assembly has a basic module and a plurality of valve modules which are mounted on the basic module side by side along a line-up direction, the basic module having a lower portion, an upper portion and a connecting portion connecting the lower and the upper portion, which enclose a receiving space for at least one valve module on three sides. The basic module has a bottom surface facing outwards and an upper side facing outwards. At least one external fluid connection is provided which is arranged on the bottom surface or on the upper side. Furthermore, at least one external electrical connection is provided which is arranged on the bottom surface or on the upper side.

22 Claims, 6 Drawing Sheets

(56) References Cited

U.S. PATENT DOCUMENTS

| | | | | |
|---|---|---|---|---|
| 6,199,590 B1 * | 3/2001 | Ferretti | ............... | F16K 27/003 |
| | | | | 137/270 |
| 6,874,537 B2 * | 4/2005 | Hayashi | ............. | F15B 13/0814 |
| | | | | 137/269 |
| 9,625,049 B2 * | 4/2017 | Starzmann | ............. | F16K 31/02 |
| 2004/0112440 A1 | 6/2004 | Bramley et al. | | |
| 2009/0242040 A1 * | 10/2009 | Kees | .................. | F15B 13/0814 |
| | | | | 137/315.09 |

* cited by examiner

VALVE ASSEMBLY

BACKGROUND OF THE INVENTION

Valve assemblies of this type, also referred to as valve islands, can be used to control complex pneumatic systems, for example. The basic module serves as a central supply module for electrical and fluidic energy by taking over the central supply with a control fluid (pneumatic or hydraulic fluid). In some applications, a central supply with process or rinsing fluids, for example, may also be desired. The use of a basic module permits in a simple manner a modular arrangement of different valve modules.

The object of the invention is to create a compact valve assembly which can be supplied with electrical energy and the required control and/or process fluids with as little efforts as possible, an exchange of individual valve modules being possible in a simple manner.

BRIEF DESCRIPTION OF THE INVENTION

This object is achieved with a valve assembly having the features of claim 1. The valve assembly according to the invention has a basic module and a plurality of valve modules which are mounted on the basic module side by side along a line-up direction, the basic module having a lower portion, an upper portion and a connecting portion connecting the lower and the upper portion which enclose a receiving space for at least one valve module on three sides. The basic module has a bottom surface facing outwards and an upper side facing outwards. At least one external fluid connection and/or at least one external electrical connection arranged on the bottom surface or on the upper side, respectively, is provided.

The external fluid connection(s) permit(s) a supply of external components (i.e. also of components which are not directly mounted on the basic module) with fluid. This in particular applies to external actuators which are to be controlled via the valve modules of the valve assembly. External actuators may for example be pneumatic cylinders or pneumatically driven valves, so-called process valves.

The external electrical connection(s) generally permit(s) a flexible electrical interconnection of individual external components of the valve assembly and in particular a data connection with an external actuator via which revertive signals as to a current position of the actuator can for example be received.

The basic module can surround the receiving space in a U-shape, the lower and the upper portion forming the legs of the U, whereas the connecting portion connects the legs of the U with each other.

The basic module can serve as a central supply module of the valve assembly (both electrically and fluidically). All interfaces required for the valve modules and also possibilities for example for transmitting control data to the valve module and/or status data from the valve module and for example for displaying this status data can thus be provided with little effort directly on the basic module.

The connection of external components with the valve assembly is considerably simplified due to the arrangement of the external fluidic and electrical connections on the two opposed sides of the valve assembly which are also readily accessible in the mounted state. Furthermore, a compact structure of the entire valve assembly can in this way be obtained, an exchange of individual valve modules being however easily possible with a few steps.

The line-up direction preferably extends parallel to the surface of both sides in order to optimally use the space given by the basic module.

The valve assembly is preferably configured such that individual valve modules can be detached from the basic module and can be connected therewith without detaching fluidic or electrical lines from the basic module and without having to move or detach components of the basic module. Preferably, the individual valve modules can substantially be connected with the basic module by being inserted into the receiving space from a front side of the basic module, and can be detached from the basic module by being pulled out of the receiving space. The direction of insertion of the valve modules can therefore be chosen approximately parallel to the bottom surface and to the upper side of the basic module such that fluidic and electrical lines connected with the external connections do not hinder an insertion and removal of the valve modules.

It turned out to be advantageous to arrange all external fluidic connections on the bottom surface and all external electrical connections on the upper side of the basic module. This arrangement can however also be inversed. It would also be conceivable to provide both external fluidic and external electrical connections on the bottom surface and/or on the upper side.

In contrast thereto, a rear side of the connecting portion which in particular corresponds to a rear side of the basic module is preferably free of external connections, such that the valve assembly, on the one hand, can be mounted close to a switch cabinet wall and, on the other hand, no lines have to be connected with the rear side which is generally difficult to access in the mounted state.

Preferably, a fluid connection face having internal fluid connections is provided on a first side of the basic module facing the receiving space and is connected with fluid connections of the valve modules, and internal electrical connections which are connected with electrical connections of the valve modules are provided on a second side of the basic module facing the receiving space. All connections of the valve modules which are required for operation can be covered by these internal fluidic and electrical connections. Further fluidic or electrical lines to the valve modules are then unnecessary.

The first side is in particular arranged on a face facing the receiving space on the lower portion. In this case, the lower portion is preferably configured as a fluid portion via which the supply of the basic module and of the valve assembly with fluid is carried out.

All fluid connections of the valve module are advantageously located directly on the fluid connections of the fluid interface in the fluid connection face such that all fluid connections of the valve module can be coupled by simply plugging the valve module onto the basic module and can be detached.

The basic module in particular offers for each valve module a fluid interface which in most cases can comprise a plurality of fluid connections for fluids providing driving energy (compressed air or hydraulic liquid, for example) and/or work fluids such as process fluids and rinsing fluids. The fluid supply with all fluids flowing through the respective valve module can thus be ensured via the fluid interface of the basic module. Therefore, the entire supply of all valve modules with fluid, in particular with inlet air, exhaust air and control air, can be realized, if desired, exclusively via the basic module, wherein it is not necessary to couple hoses or pipes to individual valve modules.

An electrical interface is furthermore preferably provided on the basic module for each of the valve modules for the current supply and, if necessary, also for the transmission of measured values or of control commands and generally for the communication with an external control unit.

The fluid connections of the respective fluid interface for an individual valve module are preferably arranged in a sectional plane perpendicularly to the line-up direction. Preferably, the electrical connection is also arranged in this sectional plane. The fluid connections and the electrical connection define a plug-in location for the respective valve module.

Normally, the electrical connection forms an electrical interface in which connections for the electrical voltage supply and the transmission of data are provided in close spatial vicinity to each other and which can advantageously be contacted via an appropriate complementary interface on the valve module by a simple putting-on.

The second side is in particular arranged on a surface on the connecting portion with faces the receiving space.

The second side can have an electrical connection face in which a series of openings are formed in the line-up direction. The individual electrical connections are each located in the region of one of the openings and are for example formed by plug sockets inserted into the openings or by electrical contacts via which the openings are accessible.

This configuration permits to configure the individual valve modules in a substantially cuboid manner, the narrowest side being located along the line-up direction to be able to mount as much valve modules as possible side by side on the basic module. The surface of the valve modules perpendicularly to the line-up direction, as far as possible, is configured approximately square such that the entire valve assembly can effectively use the available space in a switch cabinet, for example.

The internal fluid connection associated with the respective external fluid connection in the fluid connection face is preferably part of the fluid connection interface for the respective valve module. Fluid flowing to or from the external fluid connection thus in principle also flows through the valve module and through the basic module in this configuration. No additional fluid connections on the valve module which are arranged outside the fluid interface are thus necessary. The at least one external fluid connection preferably directly communicates with a fluid connection in the fluid connection face via a branch duct, for example. An actuator connected to the external fluid connection may communicate with the external fluid connection directly or via a fluid feed pipe.

This arrangement permits the unproblematic coupling of external actuators to the bottom surface of the basic module. As a standard, further fluid connections are also arranged on this bottom surface, the main feed and discharge pipes for the control fluids and/or process fluids for example, such that the bottom surface is usually freely accessible. It is of course possible to use the external fluid connections also for the connection with such general fluid supply and fluid discharge pipes, which can generally apply to all fluids used in the valve assembly.

The space in the region of the receiving space for the valve modules thus entirely remains reserved for the valve modules and possibly further functional modules, as described further below, and need not be occupied by hose couplings to further components. This also improves the accessibility of the valve modules themselves, for example for the exchange and maintenance.

Fluid supply ducts which preferably extend parallel to each other along the line-up direction and which guide fluid through the basic module are formed in the lower portion. In particular, at least one compressed-air supply duct, at least one, preferably two exhaust-air ducts, at least one control compressed-air duct and/or at least one control exhaust-air duct may be provided. Furthermore, a plurality of work fluid ducts could for example be provided as feeding duct and as discharge duct for different process and rinsing liquids. Using such an arrangement of fluid supply ducts in the basic module, it is possible in a simple manner to supply any of the fluid interfaces for the individual valve modules with all required fluids, a fluid discharge through the basic module being simultaneously given. As all fluid ducts are provided in the lower portion, the guiding of the fluid in the basic module is limited to the lower portion, and there is a spatial separation between fluid-carrying areas and current-carrying areas.

Each fluid connection in the fluid connection face preferably communicates with at least one of the supply ducts or with an external fluid connection via a branch duct. It is not necessary to provide further types of connections.

In order to permit a simple exchange of individual valve modules also during operation, a shutoff or check valve can preferably be arranged at least in one of the branch ducts, preferably in each branch duct, and is configured so as to be adapted to be opened by a valve module mounted on the basic module. When a valve module is inserted into the basic module and communicates with the fluid interface, the respective shutoff valve(s) is/are automatically opened by the valve module. Upon removal of the respective valve module, the shutoff valve is then automatically closed again such that no fluid can exit the fluid interface in the basic module during operation. The opening of the shutoff valves can be realized either mechanically, for example by means of a tappet of the shutoff valve which is arranged in the branch duct and which is actuated by the respective fluid connection of the valve module, or electronically via an appropriate interconnection of the shutoff valves with a control unit of the valve assembly.

The connecting portion preferably includes an electrical duct in which electrical connecting means extend which in this way can be simply incorporated into the basic module.

The electrical connecting means are preferably formed by a printed circuit board which extends in the line-up direction over the entire length of the electrical connection face. Electrical lines and data lines separated therefrom may be provided on the printed circuit board. It is also possible to provide electronic components such as a radio module or a control unit on the printed circuit board, which monitor valve modules and/or other functional modules inserted into the basic module and permit a communication therewith. The electrical contacts of the electrical connections may be provided directly on the printed circuit board.

The printed circuit board may also have at least one central electrical interface for the entire valve assembly, for example in the form of a central connector plug. This central connection can be configured in any appropriate way and can in particular be designed for the coupling to a bus system.

Due to the flexibility of the configuration, the entire electrical supply and interconnection of the valve assembly can be realized via the printed circuit board. Further lines, either for the current supply or the communication of data, are not necessary as these functions can be taken over by the central electrical connection.

Guides for at least one valve module which extend perpendicularly to the line-up direction are preferably provided on the upper portion on a third face of the basic module facing the receiving space. Upon insertion of the valve module into the receiving space, these guides help to maintain the desired direction of insertion perpendicularly to the line-up direction. The guides can furthermore provide a certain lateral support for the respective valve module perpendicularly to the line-up direction.

In a preferred embodiment, the upper portion comprises stationary electronic modules which are fastened to the connecting portion and are placed above the valve modules. The stationary electronic modules serve, among others, to display status messages and/or measured values.

In a preferred embodiment, the upper portion is at least substantially formed of these electronic modules.

In this embodiment, the lower portion and the connecting portion are preferably integrally manufactured from an extruded profile, whereas the upper portion is substantially realized by the mounting of the stationary electronic modules on the connecting portion.

The guides on the upper portion can then be provided on the underside of the electronic modules.

In an alternative embodiment, the upper portion also forms part of the extruded profile, wherein stationary electronic modules may then possibly be mounted on the upper portion.

The upper portion remains in any case unchanged upon insertion and removal of valve modules.

The external electrical connections on the upper portion are advantageously arranged on an upper side of the stationary electronic modules which then forms the upper side of the basic module such that the data input or output there can directly be processed and for example displayed and/or transmitted to individual valve modules by these electronic modules.

Each of the stationary electronic modules preferably extends over several valve modules so as to provide sufficient space for a display, for example. The stationary electronic modules advantageously do not require any fluid connections but merely electrical connections. Separate interfaces for the connection of the stationary electronic modules which are provided in the direction of the free edge of the connecting portion offset with respect to the electrical interfaces for the valve modules may be purposefully provided on the second side which delimits the receiving space such that the second electronic modules can be coupled independently of the valve modules.

As already mentioned, further functional modules can be inserted into the basic module in the line-up direction in addition to the valve modules.

The further functional modules for example comprise plug-in electronic modules which have electrical connections but no fluid connections. They can for example be configured as control modules for electrical drives or as diagnostic modules and can be arranged adjacent to the valve modules and can also have dimensions which are similar to those of the valve modules.

Generally, the electronic module can also include purely electrical connections for the coupling to external actuators or individual valve modules via which the valve modules can be piloted and/or read out. Such a coupling can be realized directly from the valve module or the external actuator to the respective electronic module. Alternatively, a coupling of the valve modules to the electronic modules via the electrical interfaces of the valve modules and the electronic modules and, if necessary, via an internal control unit provided on the electrical connecting means, in particular the printed circuit board, is of course also possible.

The further functional modules can furthermore comprise at least one supply module which has supply connections for the supply of the basic module with fluidic energy, the supply connections being then adapted to communicate with at least one supply duct of the basic module via at least one fluid connection of the fluid connection face. The supply module can for example use fluid interfaces on the fluid connection face.

Furthermore, at least one closure module is for example provided which is arranged on a side of the basic module perpendicularly to the line-up direction and which in particular closes all supply ducts in the basic module in a fluid-tight manner. The manufacture of the basic module is simplified when using in particular two closure modules which are respectively arranged at the lateral ends of the basic module, as the continuous supply ducts in the basic module may be left open laterally. They are each closed in a fluid-tight manner by the closure modules. The dimensions of the closure modules are simultaneously selected so as to correspond to the dimensions of the valve modules transversely to the line-up direction such that the valve assembly assumes a compact shape.

It is possible that the upper portion extends only over a central region of the receiving space which is provided for valve modules and possibly present plug-in electronic modules, but not over possible supply modules and closure modules in the end regions of the basic module.

Each of the valve modules preferably comprises an electrically controlled pilot valve and a fluidically controlled main valve. The pilot valve is usually a solenoid valve, whereas the main valve may be a fluid-controlled sliding valve. The pilot valve and the main valve may be arranged one on top of the other as viewed perpendicularly to the line-up direction, which saves space in the line-up direction. In this way, the electrical connections of the pilot valve are furthermore arranged near the electrical connection on the connecting of the basic module associated with the respective plug-in location of the valve module, whereas the fluid connections of the main valve are located directly above fluid connections in the fluid connection face in the lower portion of the basic module. Such a shape of the valve modules results in an approximately square shape of the entire valve assembly in a top view along the line-up direction, which permits to make better use of the depth of a switch cabinet in which the valve assembly is to be fitted.

For a simple mounting of the valve modules, a fastening structure having at least one inclined surface and into which the valve modules can be inserted, is preferably formed on the basic module, the inclined surface being oriented so as to exert a clamping force onto the respective valve module which presses the fluid connections of the valve module against the associated fluid connections of the fluid connection face. Upon insertion of a valve module into the basic module onto one of the designated plug-in locations, an exact positioning of the valve module is simultaneously realized in which a sealed fluidic communication with the fluid connections of the fluid interface of the basic module is also already obtained. It is in particular unnecessary to couple individual fluid connections separately. Generally, all fluid connections should already be coupled by the simple insertion of the valve module at the associated plug-in locations by the insertion of the valve module into the basic module and the fastening structure, a fluid tightness with respect to the environment being also realized.

Preferably, the coupling with the electrical connection is also realized by means of a simple plug connection in which the plug or a socket on the valve module is plugged into the respective mating connection in the electrical interface when the valve module is inserted into its plug-in location.

In order to fasten the valve modules to the basic module, preferably fixing elements are provided for the fastening of the valve modules which are for example arranged in the region of a free end of the lower portion. The fixing elements can in particular be fastening openings into which a screw can for example engage so as to screw the valve module to the basic module.

Such fastening structures and/or fixing elements can also be provided for further functional modules, in particular for supply modules, closure modules and electronic plug-in-modules.

The fastening structure is preferably configured such that a valve module can be slipped onto its plug-in location substantially parallel to the fluid connection face and perpendicularly to the line-up direction, only with a slight tilting. The space between the mounted valve modules and the upper portion should correspondingly allow for this fitting clearance, wherein it is however possible to arrange the upper portion practically directly above the valve modules, as a result of which a compact structure and a uniform appearance are obtained.

According to a further aspect of the invention, at least one fastening element for the mounting of the valve assembly, in particular in a switch cabinet is provided on the basic module, such that the entire valve assembly can be mounted in a switch cabinet in a simple and space-saving manner. The fastening element(s) is/are formed in one piece with the basic module, which additionally reduces the manufacturing costs and makes a mounting of the valve assembly more stable.

A first fastening element is preferably provided on the bottom surface of the basic module and can be formed by fastening openings in the bottom surface. The valve assembly can be fixed to the bottom of a switch cabinet by means of a first fastening element of this type by being screwed to the bottom of the switch cabinet from the underside of the switch cabinet, for example.

A second fastening element can alternatively or additionally be arranged on the rear side of the connecting portion, which is in particular formed by a groove in the connecting portion, in particular in the rear side thereof, which extends in the line-up direction and which is configured so as to be plugged onto a supporting rail. The supporting rail, for example a top-hat rail is advantageously fastened to a wall of the switch cabinet such that a mounting on the wall of the switch cabinet is possible by means of the second fastening element. The orientation of the valve assembly remains the same irrespective of the choice of the first or of the second fastening element.

In case the body of the basic module comprises an extruded profile, the latter preferably already has the basic shape of the lower portion and of the connecting portion and possibly also of the upper portion in case the latter is not or not exclusively formed of stationary electronic modules. Furthermore, all fluid supply pipes in the lower portion, the electrical duct in the connecting portion, the groove of the second fastening element and the fastening structure having the inclined surface(s) for the generation of the pressure force for the valve modules can also already be provided in the extruded profile. Preferably, all required geometries which can be formed as continuous structure in the line-up direction can generally already be realized in the extruded profile. The extruded profile can be formed in one piece, or several separately manufactured extruded profiles can be assembled.

The openings which cannot be manufactured by extrusion and the fluid connections on the fluid connection face, the fastening openings for the functional modules, the branch ducts to the fluid ducts and to the bottom surface, fastening openings and openings for the electrical connections in the electrical ducts are then formed and, if necessary, the stationary electronic modules are mounted for the completion of the basic module.

BRIEF DESCRIPTION OF THE DRAWINGS

The invention is described in more detail below on the basis of an example embodiment with reference to the accompanying drawings. In the drawings.

DETAILED DESCRIPTION OF THE INVENTION

Generally, for reasons of clarity, only few of the components that are present several times are provided with reference numbers.

Figure 1:
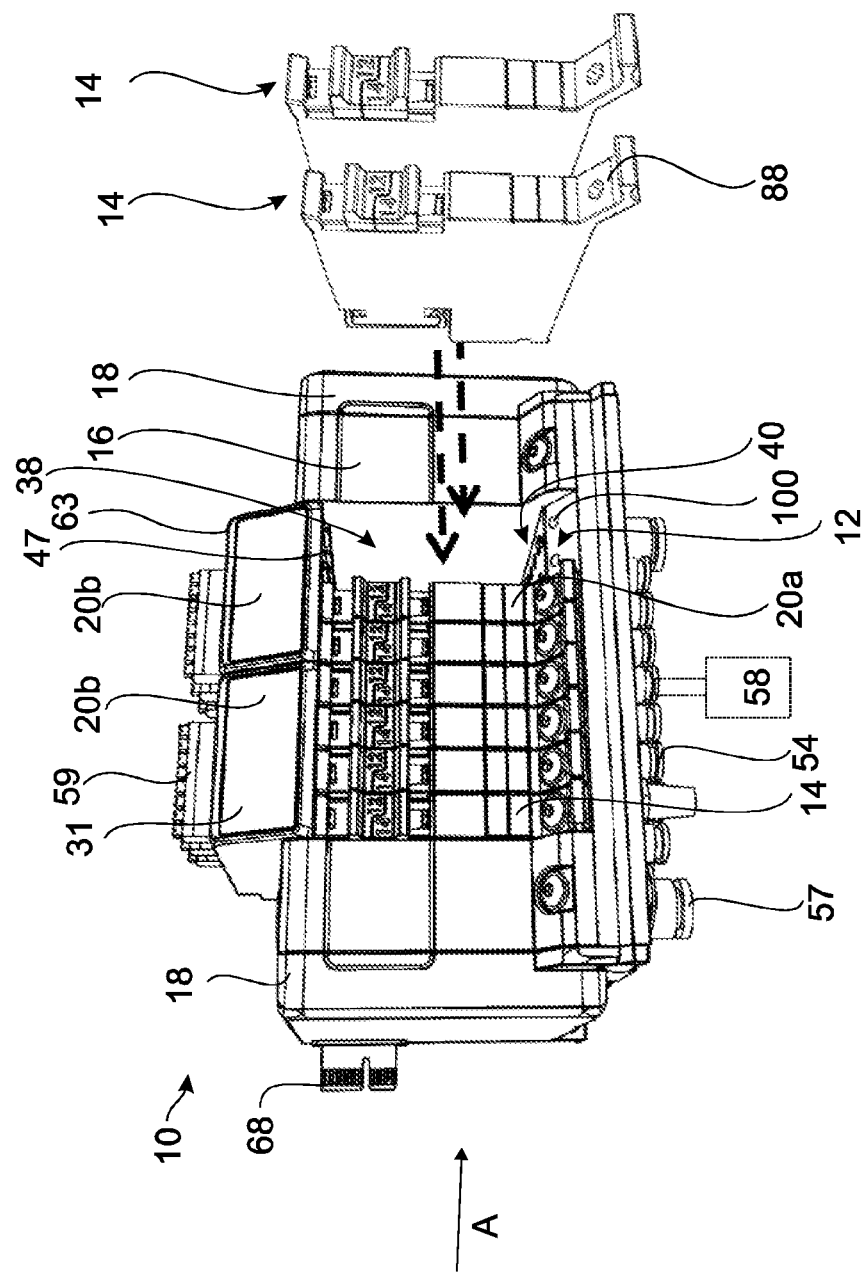
FIGS. 1 and 2 show schematic perspective views of a valve assembly according to the invention.
Figure 2:
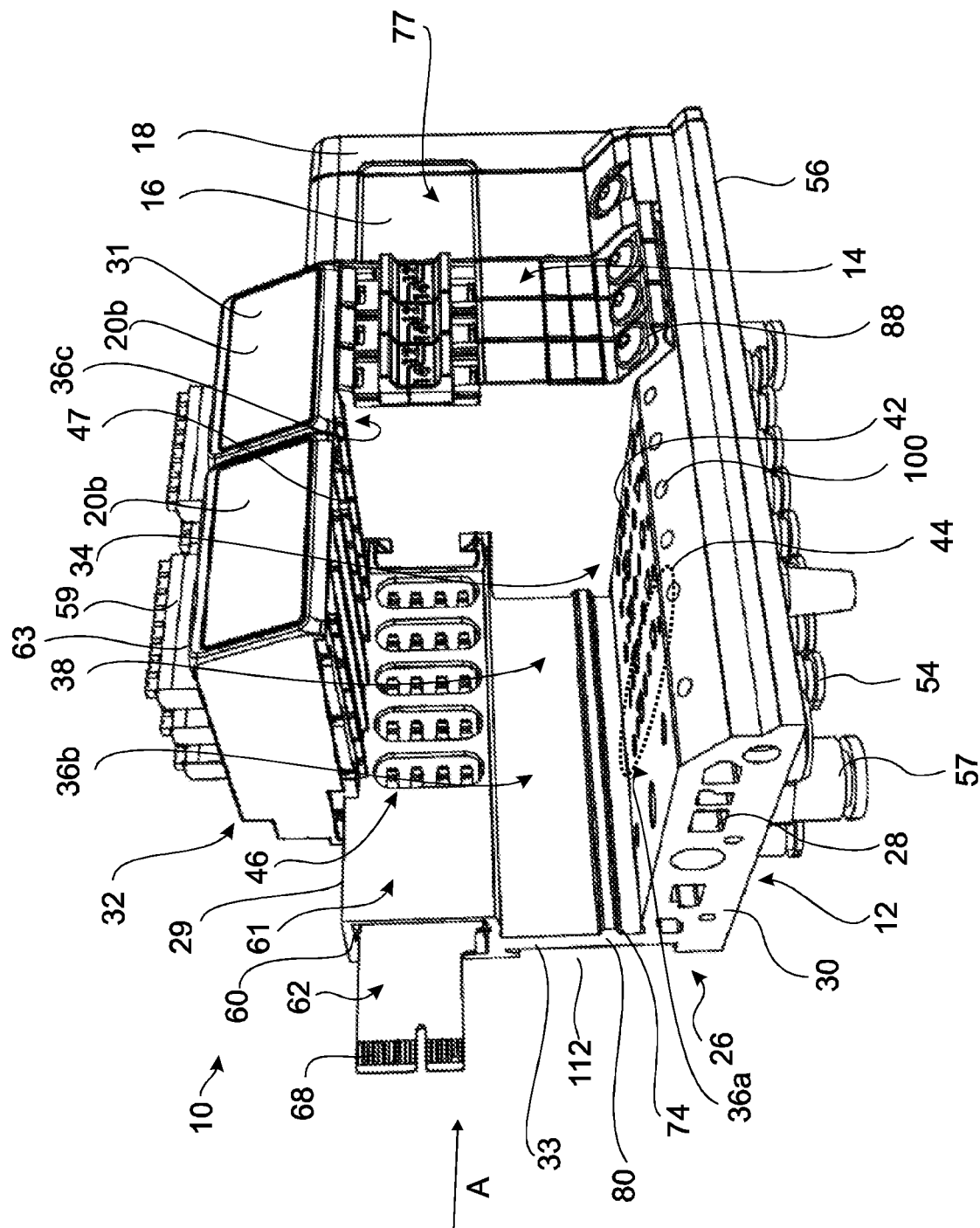

FIGS. 1 and 2 show a valve assembly 10 having a basic module 12 and a plurality of separate valve modules 14 which are adapted to be mounted on the basic module 12 side by side along a line-up direction A.

The valve assembly 10 has a preferred orientation in which it is for example mounted on a switch cabinet and corresponds to the orientation shown in FIGS. 1 and 2. When orientation-related terms are used in this application, this always relates to this orientation of the valve assembly 10. It would theoretically also be conceivable to mount the valve assembly 10 in a different orientation, which of course has no impact on the described features.

The valve assembly 10 for example serves to combine a process control or fluid distribution requiring a plurality of valves in a space-saving manner and to permit a flexible arrangement of valve modules that is adapted to the respective purpose of use in a kind of modular construction system.

In this example, the same basic module 12 is always provided, whereas the kind and number of the mounted valve modules 14 may vary.

The valve modules 14 are here associated with a group of so-called functional modules to which supply modules 16, closure modules 18 and plug-in electronic modules 20a also belong in the present example and which, if necessary, can be fixed on predetermined plug-in locations on the basic module 12 provided side by side in the line-up direction A.

Figure 3A:
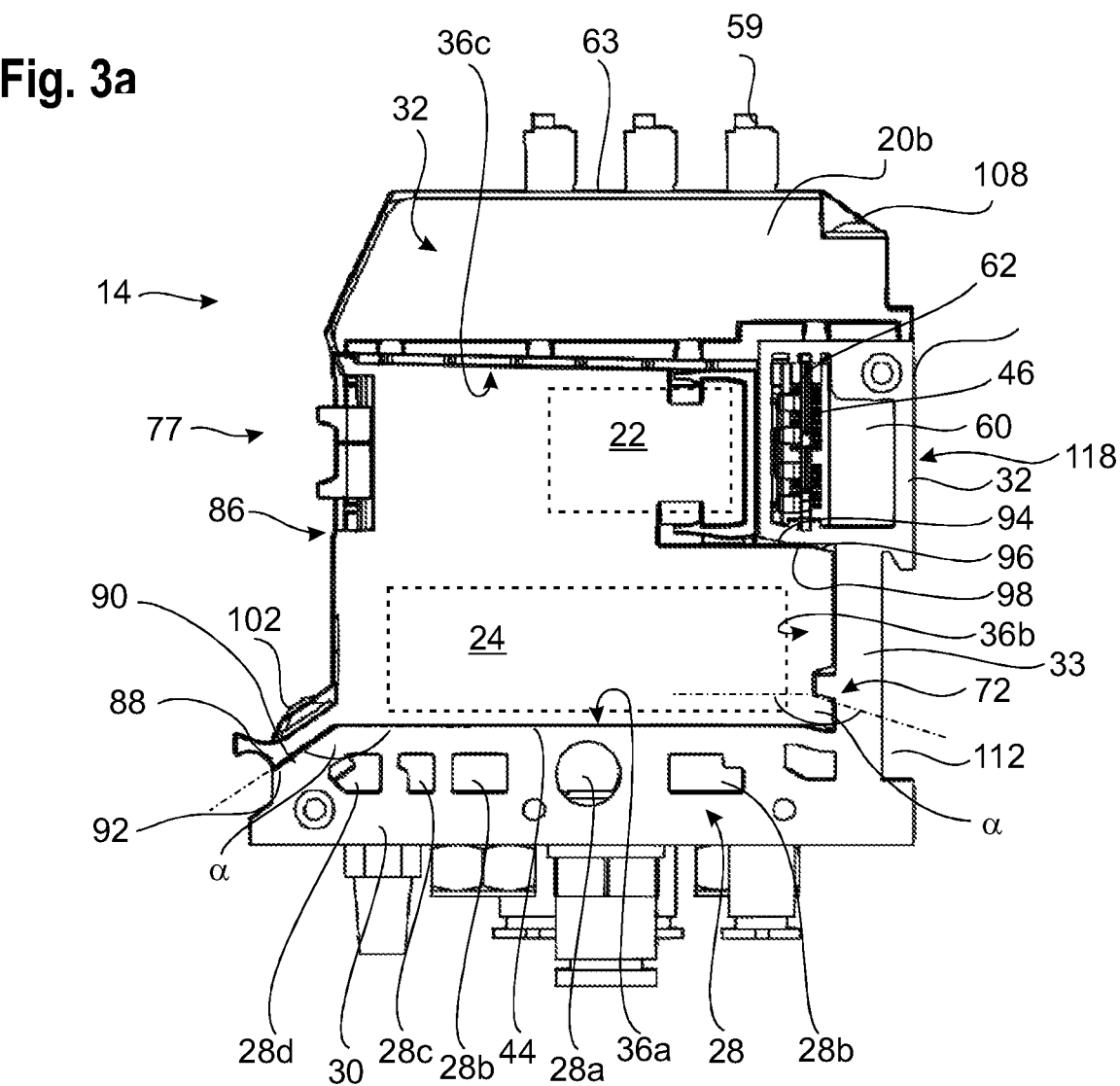
FIG. 3a shows a schematic lateral view of the valve assembly of FIG. 1 without the closure module.

Valve modules 14 principally comprise at least one valve. The valve modules 14 shown here each comprise a pilot valve 22 which is piloted electrically and works for example pneumatically (here an electrofluidic solenoid valve), and a main valve 24 which is usually configured as a sliding valve (see FIG. 3a).

Figure 4:
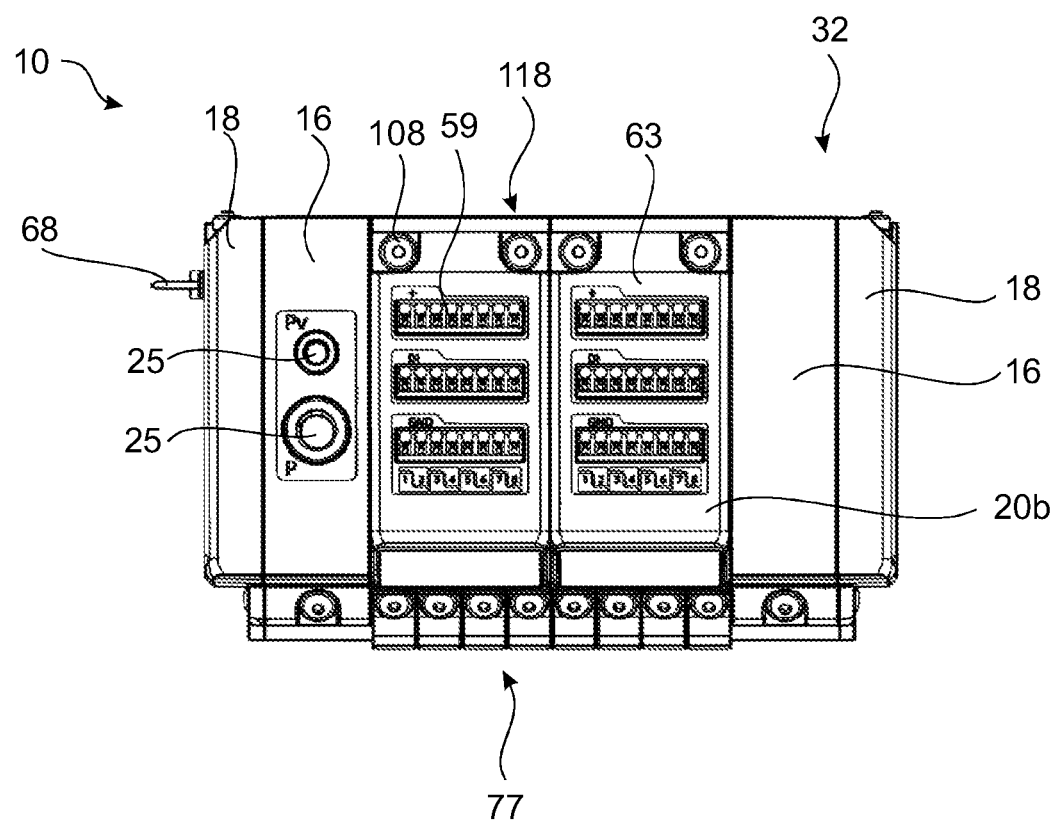
FIG. 4 shows an upper side of the valve assembly of FIG. 1.
Figure 5:
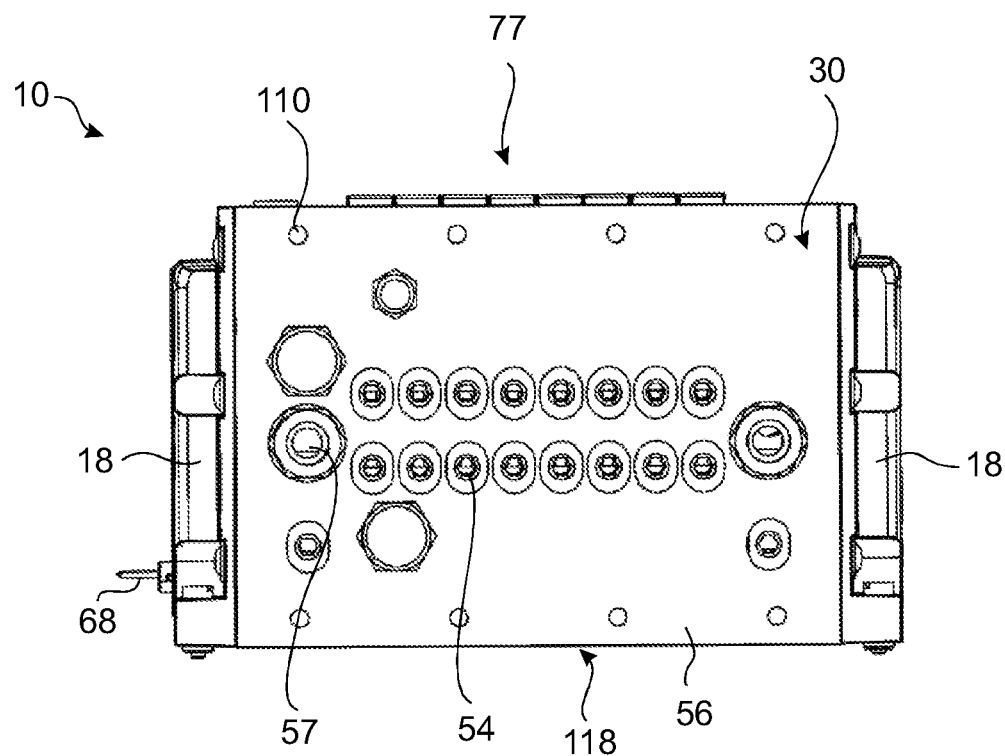
FIG. 5 shows a lower side of the valve assembly of FIG. 1.

The supply module(s) 16 generally permit(s) an introduction or discharge of work, control or process fluids into the basic module 12 via supply connections 25, for example (see FIG. 4). The supply modules 16 may be configured without valves.

The plug-in electronic modules 20a are for example designed for the control of external electrical drives or as diagnostic modules for the status determination of components of the valve assembly 10. They can substantially have the same dimensions as the valve modules 14 and can also be mounted on plug-in locations.

It is for example possible to provide electrical components such as sensors or also electrically actuated shutoff valves.

In the example shown here, two closure modules 18 are furthermore provided which are fitted on opposite sides on one respective lateral face 26 of the basic module 12 to close and seal fluid supply ducts 28 opening there and described in more detail below with respect to the environment.

One respective closure module 18 could also be combined with one respective supply module 16 so that they are fitted to the lateral face 26 of the basic module 12 as a unit and simultaneously close the basic module 12 to the outside and permit the feeding-in and discharge of fluids into and out of the basic module 12.

It is also possible to mount further functional modules which are not shown here and for example have a sensor system on the basic module 12 in the valve assembly 10.

The basic module 12 has a body which is in particular made of a metallic material such as aluminum or an appropriate plastic material and which can for example be manufactured from an extruded profile. In the example shown in the figures, a one-piece substantially L-shaped extruded profile is used to manufacture the body. The body could however also be assembled of several extruded profiles which are connected with each other.

In this embodiment, several (here two) stationary electronic modules 20b which also form part of the basic module 12 are mounted on an upper edge 29 of the body, i.e. on a free edge of one of the arms of L.

The stationary electronic modules 20b comprise here display means 31 and/or operating elements and electrical connections for the coupling to control units, individual valve modules 14 (not shown), sensor inlets and/or external electrical connections 59 for the electrical coupling with further components. The electrical connections 59 are here provided on the upper side 63 of the stationary electronic modules 20b and are substantially arranged in one plane. They generally permit a flexibly usable electrical contact of components of the valve assembly 10 and are in particular designed as revertive connections to receive acknowledgments from external components which are connected to the valve assembly 10 and are controlled thereby.

The stationary electronic modules 20b can in this way for example receive, display status messages, measured values, control commands and other parameters and/or transmit them to a control unit.

The stationary electronic modules 20b are arranged above the plug-in locations for the valve modules 14. They project from the upper edge 29 and extend substantially parallel to the other arm of the L.

Fixing elements for example in the form of threaded bores are here provided on the upper free edge 29 of the body, into which fixing elements 108 here in the form of screws can be inserted which engage through the stationary electronic modules 20b to couple the stationary electronic modules 20b to the body. The stationary electronic modules 20b are in this way firmly secured to the body of the basic module 12 (see also FIG. 3a).

At least one of the stationary electronic modules 20b can extend over several valve modules 14 in the line-up direction A such that larger displays can also be realized. However, the stationary electronic modules 20b do not rest against the valve modules 14 so that the valve modules 14 can be mounted and demounted without having to detach the stationary electronic modules 20b.

In a sectional view, the basic module 12 is therefore approximately U-shaped. The lower arm of the L-shaped body forms one of the legs of the U and constitutes a lower portion 30 of the basic module 12. The stationary electronic modules 20b form here substantially the second leg of the U and constitutes an upper portion 32 of the basic module 12. The lower and the upper portion 30, 32 are here connected with each other by a connecting portion 33 of the basic module 12 which is realized by the arm of the L-shaped body which extends vertically in the mounted state.

The basic module 12 thus forms a receiving space 38 which is enclosed on three sides 36a, 36b, 36c and in which the valve modules 14 and, if necessary, plug-in electronic modules 20a are received. The first and the second side 36a, 36c are here oriented substantially parallel to each other, whereas the third side 36b extends perpendicularly thereto.

In an alternative that is not shown, the upper portion 32 is also a constituent of the body of the basic module 12 and could also be part of the extruded profile. In this case, the stationary electronic modules 20b can for example be mounted on or in the upper portion.

The first side 36a which delimits the receiving space 38 is formed by the inner surface of the lower portion 30 facing the receiving space 38, whereas the second side 36b is formed by the inner surface of the connecting portion 33 facing the receiving space 38 and the third side 36c is formed by the inner surface of the upper portion 32 facing the receiving space 38.

The lower portion 30 defines a fluid area 34 whereas an electrical connection face having internal electrical connections 46 for the valve modules 14 and, if necessary, for plug-in electronic modules 20a and supply modules 16 are provided in the connecting portion 33. The entire supply of the valve assembly 10 with fluid is here carried out via the lower portion 30, whereas the entire electrical supply is carried out via the connecting portion 33 such that the electrical and fluidic supply are spatially completely separated.

The fluid area 34 has a plane fluid connection face 40 into which a plurality of internal individual fluid connections 42 is formed.

The valve modules 14 are arranged in the receiving space 38 side by side along a line-up direction A, the line-up direction A extending parallel to the portions 30, 32, 33.

Perpendicularly to the line-up direction A, all fluid connections 42 of the fluid connection face 40 arranged in a row one behind the other are respectively combined to an internal fluid interface 44 for one respective valve module 14. The arrangement of the fluid connections 42 could of course also be chosen differently such that a fluid interface 44 can for example also include several fluid connections 42 which are arranged side by side in the line-up direction A.

The fluid interfaces 44 each belong to one of the predetermined plug-in locations for one of the valve modules 14.

A plug-in location also includes an associated in most cases multipolar electrical connection 46 on the electrical connection face 36 which forms an electrical interface and comprises a group of connection possibilities for current supply and data lines that are arranged in close vicinity with respect to each other. The internal electrical connections 46 are all located one behind the other in the line-up direction A. The internal fluid interface 44 and the internal electrical interface are arranged in the same sectional plane as the line-up direction A, as can be seen in FIG. 2, for example.

Since the fluid area 34 and the electrical connection face 36 are spatially separated from each other, this also applies to the internal fluid interface 44 and the internal electrical connection 46.

Upon insertion onto the associated plug-in location, the respective valve module 14 automatically contacts all internal fluid connections 42 of the respective fluid interface 44 on the fluid connection face 40 and all associated electrical contacts in the internal electrical connection 46. A further coupling of fluidic or electrical lines is unnecessary, and the valve modules 14 only communicate with the internal fluid connections 42 and the internal electrical connections 46.

The slipping of the valve modules 14 onto the respective plug-in location is realized perpendicularly to the line-up direction A and parallel to the first leg 30.

In the example shown here, a plurality of guides 47 which are arranged side by side and extend perpendicularly to the line-up direction A are provided on the third side 36c, i.e. on the underside of the upper portion 32 facing the receiving space 38. The respective valve module or the plug-in electronic module 20a is guided laterally in the guide 47 upon insertion into the receiving space 38.

Here, the individual valve modules 14 have a cuboid shape, the narrowest sides of the cuboid lying along the line-up direction A, and the lateral faces oriented perpendicularly to the line-up direction A being configured approximately square.

Figure 3B:
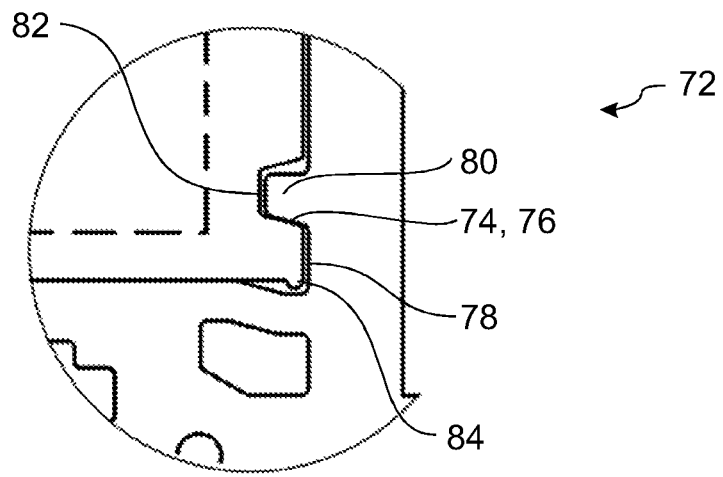
FIG. 3b shows a detail view of a fastening structure for a valve module in an enlarged detail of FIG. 3.

The pilot valve 22 and the main valve 24 of a valve module 14 are here arranged such that the main valve 24 (in the mounted state as respectively shown in the figures) is arranged at the bottom, i.e. in close vicinity to the fluid interface 44, whereas the pilot valve 22 which also requires electrical connections is arranged in close vicinity to the electrical connection 46 (FIG. 3). With respect to the line-up direction A, the pilot valve 22 and the main valve 24 are therefore arranged substantially one on top of the other rather than side by side. The pilot valve 22 of course also has internally a coupling to the internal fluid connections 42 of the fluid interface 44 to permit a supply with work fluid, for example compressed air, for a piloting.

A plurality of fluid supply ducts 28 which can each be associated with different fluids and different functions extend along the line-up direction A in the lower portion 30. In this example, all fluid supply ducts 28 entirely extend through the lower portion 30 from one lateral face 26 up to the opposite lateral face 26. They are for example formed along with the extruded profile from which the body of the basic module 12 is formed, during the manufacture thereof.

The fluid supply ducts 28 can for example comprise a compressed-air supply duct 28a and one or two exhaust-air ducts 28b on both sides of the compressed-air supply duct 28a which are fluidically coupled with the main valve 24, for example. Furthermore, a control compressed-air duct 28c and a control exhaust-air duct 28d are for example provided and are adapted to be coupled with the pilot valve 22 in order to supply compressed-air as control fluid for the pilot valve 22. In this example, the only fluid which is used is compressed-air, and the function of the valve arrangement is substantially the controlled distribution of compressed air.

The number and the occupation of the individual fluid supply ducts 28 however remain up to the person skilled in the art. It would for example also be conceivable to use a hydraulic liquid rather than compressed air or to also provide fluid supply ducts 28 for process and rinsing fluids in addition to control fluid ducts.

Some of the fluid connections 42 are coupled with the fluid supply ducts 28 which extend parallel to the line-up direction A via branch ducts 48 which lead perpendicularly to the fluid connection face 40 into the interior of the lower portion 30.

Others of the fluid connections 42 are coupled with one respective external fluid connection 54 on a bottom surface 56 of the basic module 12 via branch ducts 48 which constitute passage openings through the complete material thickness of the lower portion 30. The bottom surface 56 forms the side of the lower portion 30 which is opposite the fluid connection face 40 and is oriented parallel to the fluid connection face 40.

Each of the internal fluid connections 42 of the fluid connection face 40 is thus coupled either with a fluid supply duct 28 or with a fluid connection 54 on the bottom surface 56.

Further external fluid connections 57 are here also provided in the bottom surface 56 as supply connections and permit alternatively or in addition to the supply connections 25 of the supply modules 16 the introduction and/or discharge of work or process fluids into the basic module 12.

Figure 6:
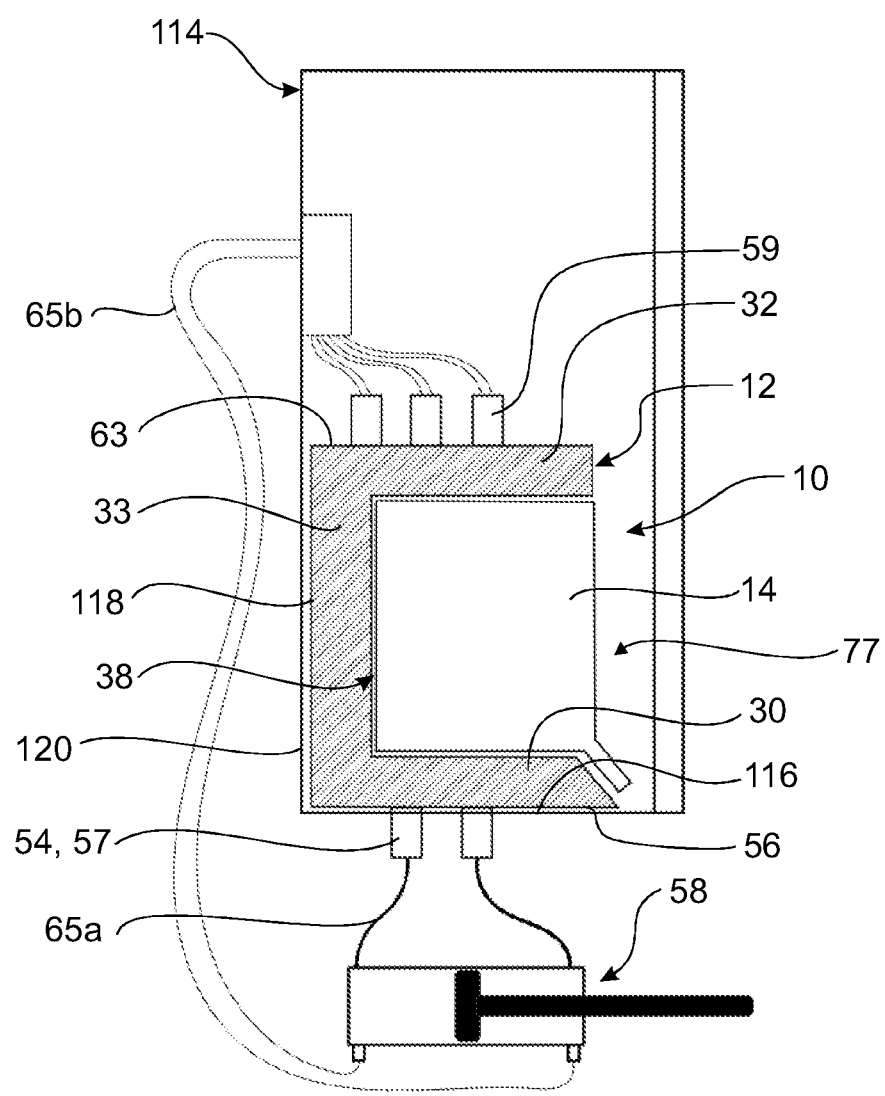
FIG. 6 shows a schematic sectional view of the valve assembly of FIG. 1 mounted in a switch cabinet.

In this example, all external fluid connections 54 on the bottom surface 56 are provided for the coupling with external actuators 58 (via fluid pipes 65a, indicated in FIGS. 1 and 6) which are piloted via the valve modules 14 in that the fluid supply thereof is controlled by the valve modules 14. The external actuators 58 are completely supplied with control fluid, compressed air, for example, via the fluid connections 42.

The external actuators 58 or revertive means in the external actuators 58 are here adapted to communicate with electronic connections 59 on the stationary electronic modules 20b via electrical lines to transmit the current position of the external actuators 58 or other revertive signals thereto, for example.

It would also be conceivable to use fluid connections 54, 57 for discharging a process fluid out of the basic module 12 when the associated valve module 14 is piloted correspondingly.

In this example, the valve modules 14 furthermore have no fluid connections which would not be coupled with one of the internal fluid connections 42 of the fluid interface 44 on the fluid connection face 40, this is however at the discretion of a person skilled in the art.

For an electrical contact, a continuous electrical duct 60 in which an electrical connecting means 62, a printed circuit board in this example, is received is formed in the connecting portion 33 in the electrical area. After the completion of the body of the basic module 12 from the extruded profile, the printed circuit board is inserted into the electrical duct 60.

A series of openings to the electrical duct 60 arranged therebehind are formed along the line-up direction A in the electrical connection face in the side 36b of the connecting portion 33. The individual electrical connections 46 are respectively located in the region of one of the openings and are for example formed by plug sockets inserted into the openings or by contacts directly on the electrical connecting means 62 which are accessible through the openings. The electrical connecting means 62 here has all lines required for the current supply, the data transmission and the communication with external components, the lines being in particular designed in the form of conductive tracks on the printed circuit board. The electrical connecting means 62 can be configured as a bus system for data communication.

The electrical connecting means 62 also has the contacts of the electrical connections 46 for the individual valve modules 14 which can also simply be configured as contacts on the printed circuit board in case a printed circuit board is used.

Furthermore, in this example, several electrical electronic module interfaces which are separated from the electrical connections 46 and which serve as an interface for the stationary electronic modules 20b (not shown) are additionally formed at the upper edge of the printed circuit board. Any of the stationary electronic modules 20b has for example its own interface which automatically comes into contact with the electronic module interface on the electrical connecting means 62 upon fixing the stationary electronic modules 20b to the fixing elements and thus establishes the electronic and electrical connection between the electrical connecting means 62 and the stationary electronic module 20b.

In this example, the electrical connecting means 62 furthermore have a control unit which is also arranged on the printed circuit board and which can be used to output or transmit status messages, for example, or to transmit measuring data transmitted by one of the valve modules 14 to one of the stationary electronic modules 20b where the data is displayed. However, the control unit can for example also be used to implement incoming control commands for controlling the individual valve modules 14.

The electrical connecting means 62 have at least at one end a single general connecting location 68 in which all separate lines to the individual valve modules 14, the electronic modules 20a, 20b and the control unit for example converge in the form of a plug. The valve arrangement 10 can be coupled with external devices, for example a control and/or a voltage source, via this connection location 68.

The electrical connecting means 62 also permit a communication with a central control of the valve arrangement 10 (not shown).

As shown in FIGS. 1 and 2, an aperture can be formed in at least one of the closure modules 18 through which the connection location 68 projects for the coupling with a cable or with further components adapted to be coupled there.

In some or in all branch ducts, check valves or shutoff valves can be respectively arranged (not shown) which are for example configured so as to stop a fluid outflow from the basic module 12 when the corresponding internal fluid connection 42 of the fluid interface 44 is not occupied by a valve module 14. The check or shutoff valves are then configured so as to be automatically opened when a corresponding valve module 14 is placed onto the plug-in location to which the respective fluid connection 42 belongs. In this case, the respective check or shutoff valve is opened by the valve module 14. This can be realized mechanically or electronically. When the valve module 14 is removed from its plug-in location, the check or shutoff valve automatically closes and thus prevents the exit of fluid or the penetration of dirt into the fluid connections 42.

It is principally possible to provide all fluid connections 42 with such a check or shutoff valve. They can however also be provided only in the compressed-air supply duct 28a, e.g.

A fastening structure 72 is provided on the basic module 12 which simplifies the insertion of the valve modules 14 at the respective plug-in location and the fastening of the valve module 14 to the basic module 12. The fastening structure 72 comprises inclined surfaces 74 on the second side 36b, i.e. on the connecting portion 33, which are adapted to cooperate with inclined surfaces 76 on the rear side of the valve module 14.

The valve modules 14 are inserted into the fastening structure 72 from a front side 77 of the basic module 12, the inclined surfaces 74, 76 sliding against each other and ensuring a pressure force which is oriented in the direction of the fluid connection face 40 and thus presses the fluid connections of the valve modules 14 onto the internal fluid connections 42.

The inclined surfaces 74 are here formed on a continuous groove 78 in the connecting portion 33 which can be produced during the extrusion of the extruded profile. The upper edge of the groove 78 can furthermore be configured as a kind of nose 80 which cooperates with an appropriate recess 82 on the rear side of the valve module 14.

To prevent seals on the fluid connection face 40 or on the underside of the valve module 14 from being damaged upon insertion of the valve module 14 into the basic module 12, a spacer 84 is provided in the form of a projection projecting from the bottom surface of the valve module 14 (see FIGS. 3a and 3b) which prevents seals between the fluid connection face 40 and the valve module 14 from being damaged when the valve module 14 is slipped onto its plug-in location. The spacer 84 rests on the fluid connection face 40 upon insertion of the valve module 14 and plunges into the groove 78 which is slightly recessed with respect to the fluid connection face 40 (see FIG. 3b) only at the very end of the insertion process. The seals thus come in contact with the fluid connection face 40 only at the very end of the insertion process and can form a fluidic communication between the valve module 14 and the respective internal fluid connections 42 which is sealed with respect to the environment.

During the end of the insertion process, the inclined surface 74 on the connecting portion 33 also comes into contact with the complementary inclined surface 76 on the valve module 14 having the same orientation, as a result of which a pressing force is generated in the direction towards the fluid connection face 40.

A projection 88 is formed on the front side 86 on the valve module 14, which has a further inclined surface 90 cooperating with an inclined surface 92 at the free edge of the lower portion 30 and resting in a flat manner thereon when the valve module 14 is completely inserted into its plug-in location. The inclined surfaces 90, 92 are inclined with respect to the fluid connection face 40, in the present example at an angle $\alpha$ of an amount of about 135° to 160°. With regard to the amount, the inclined surfaces 74, 76 along with the fluid connection face 40 form approximately the same angle $\alpha$.

In addition, a further inclined surface 94 can be provided on the connection portion 33 which cooperates with an inclined surface 96 having the same orientation on the rear side of the valve module 14 and which is oriented substantially parallel to the inclined surface 74. The inclined surface 94 is formed on an underside 98 of the electrical duct 60. The electrical duct 60 partly projects from the area of the second side 36b which is directly adjoining in the direction towards the lower portion 30. In this region, the valve module 14 is slightly recessed so as to adapt the shape of the connecting portion 32.

It would also be possible to provide only the inclined surface pairs 74, 76 or 94, 96.

Fixing elements 100 in the form of threaded bores are provided on the basic module 12, into which fastening means 102, for example screws can be inserted which engage through a passage opening in the projection 88 on the front side 86 of the valve modules 14 to firmly couple the respective valve module 14 with the basic module 12 (see FIG. 3, for example). This coupling is closed only when the valve module 14 is completely and correctly inserted into its plug-in location.

To remove the valve module 14, the fixing means 102 is detached and the valve module 14 is withdrawn from its plug-in location. Further steps are not required.

The plug-in electronic modules 20a can be mounted on the basic module 12 in the same way, wherein they respectively use one of the electrical connections 46.

Two different fastening elements 110, 112 are formed on the basic module 12 to fasten the valve assembly 10 in a switch cabinet 114, for example.

The first fastening element 110 is here composed of a series of fastening openings, for example threaded bores in the bottom surface 56 of the lower part 30, fastening openings being provided along a free edge of the lower part 30 and along the edge of the lower part 30 where it communicates with the connection portion 33, i.e. in places in which the fastening opening does not hinder a positioning of the fluid supply ducts 28.

The valve assembly 10 can for example be fixed to the bottom 116 of a switch cabinet 114 by means of the first fastening elements 110. One opening is then appropriately formed in the bottom 116 of the switch cabinet 114, onto which the bottom surface 56 of the basic module 12 is placed such that the external fluid connections 54, 57 and optionally present supply connections for the feeding-in or discharge of different fluids into the fluid supply ducts 28 are accessible from the underside of the switch cabinet 114. The basic module 12 can be fastened to the edge of the opening at the bottom 116 of the switch cabinet from the underside of the switch cabinet 114.

The second fastening element 112 is arranged on a rear side 118 of the connecting portion 33. It has here the shape of a groove which extends in the line-up direction A along the rear side 118 of the connecting portion 33. In cross-section, the groove of the second fastening element 112 is adapted to the shape of a supporting rail, for example a top-hat rail such that the basic module 12 along with all functional modules mounted thereon can for example be slipped onto a supporting rail mounted on a rear or lateral wall 120 of the switch cabinet 114 (not shown).

The orientation of the valve assembly 10 remains the same irrespective of the use of the first or of the second fastening elements 110, 112.

The external fluidic and electrical connections 54, 57, 59 are here generally placed on the underside or upper side of the valve assembly 10 and form two readily accessible and spatially separate connection planes. The receiving space 38 for the valve modules 14 which is accessible from the front side 77 of the valve assembly 10 and on the inner surfaces of which internal fluidic and electrical connections 42, 46 for the valve modules 14 are arranged is located therebetween. Fastening elements 112, 110 via which the entire valve assembly 10 can be mounted in a switch cabinet 114 are provided on the rear side 118 and on the bottom surface 56 of the basic module 12. The valve assembly 10 is therefore very compact.

At the discretion of a person skilled in the art, it would of course also be possible to arrange the fluid area 34 in the upper portion 32 or to provide the external electrical connections 59 on the bottom surface 56. It is also conceivable to place both external fluid connections 54, 57 and external electrical connections 59 on the bottom surface 56 and/or on the upper side 63. The valve assembly 10 could also be mounted in an orientation that differs from the shown orientation.

As mainly described here, compressed air can be used as the only fluid in the valve assembly 10. However, it is alternatively or additionally of course also possible to use other fluids, either as process fluids, work fluids or rinsing fluids. The external fluid connections 54 on the bottom surface 56 can not only be used for the coupling of external actuators 58, but also for other appropriate purposes.

The invention claimed is:

1. A valve assembly having a basic module and a plurality of valve modules that includes at least three individual valve modules which are mounted on the basic module side by side along a line-up direction, the basic module having a lower portion, an upper portion and a connecting portion connecting the lower and the upper portion which enclose a receiving space for at least one valve module on exactly three sides, in a U-shape, in a plane perpendicular to the line-up direction, and the lower portion having a bottom surface facing outwards and the upper portion having an upper side facing outwards, at least one external fluid connection and at least one external electrical connection being provided, the at least one external fluid connection being arranged on the bottom surface and the at least one external electrical connection being arranged on the upper side, wherein the valve assembly is configured such that individual valve modules can be detached from the basic module and can be connected therewith without detaching fluidic or electrical lines from the basic module and without having to move or to detach components of the basic module, a direction of insertion of the valve modules being parallel to the bottom surface and to the upper side of the basic module.

2. The valve assembly of claim 1 wherein a rear side of the connecting portion facing outwards is free of external connections.

3. The valve assembly of claim 1 wherein the at least one external fluid connection is arranged on the bottom surface and the at least one external electrical connection is arranged on the upper side.

4. The valve assembly of claim 1 wherein a fluid connection face having internal fluid connections is provided on a first side of the basic module facing the receiving space and is connected with fluid connections of the valve modules, and in that internal electrical connections which are connected with electrical connections of the valve module are provided on a second side of the basic module facing the receiving space.

5. The valve assembly of claim 4 wherein the first side is arranged on a face facing the receiving space on the lower portion and/or in that the second side is arranged on a face facing the receiving space on the connecting portion.

6. The valve assembly of claim 4 wherein the at least one external fluid connection communicates with a fluid connection in the fluid connection face.

7. The valve assembly of claim 6 wherein a fastening structure into which the valve modules can be inserted is formed on those sides of the basic module which delimit the receiving space, the fastening structure comprising at least one inclined surface which is directed so as to exert a clamping force onto the respective valve module which presses fluid connections of the valve module against the associated fluid connections of the fluid connection face.

8. The valve assembly of claim 1 wherein the connecting portion has an electrical duct in which electrical connecting means extend and which has electrical connections for the valve modules.

9. The valve assembly of claim 1 wherein guides for at least one valve module which extend perpendicularly to the line-up direction are provided on the upper portion on a third face of the basic module facing the receiving space.

10. The valve assembly of claim 1 wherein the upper portion comprises stationary electronic modules, which are fastened to the connecting portion.

11. The valve assembly of claim 10 wherein the upper portion is at least substantially formed of the stationary electronic modules.

12. The valve assembly of claim 1 wherein in addition to the valve modules, at least one further functional module is arranged on the basic module the further functional module belonging to a group of modules containing a plug-in electronic module which has electrical connections but no fluid connections, a supply module which includes supply connections for the supply of the basic module with fluidic energy, the supply connections communicating with at least one fluid supply duct of the basic module via at least one fluid connection of the fluid connection face, and a closure module which is arranged on one side of the basic module transversely to the line-up direction.

13. The valve assembly of claim 1 wherein at least one fastening element is provided on the basic module for the mounting of the valve assembly.

14. The valve assembly of claim 13 wherein a first fastening element is arranged on the bottom surface of the basic.

15. The valve assembly of claim 13 wherein a second fastening element is arranged on the rear side of the connecting portion.

16. The valve assembly of claim 1 wherein the basic module forms a U-shaped receiving space for the valve modules, the basic module being rigid even in a condition without mounted valve modules.

17. The valve assembly of claim 1 wherein the basic module receives all valve modules.

18. The valve assembly of claim 1 wherein the basic module allows removal of a single valve module while other valve modules remain held in the basic module.

19. The valve assembly of claim 1 wherein the basic module surrounds the valve modules at three of their sides.

20. The valve assembly of claim 1 wherein the basic module has three legs forming the upper portion, the lower portion and the connecting portion, with all fluid connections being arranged at a first of the legs, with all electric connections being arranged at a second of the legs, and with display means being arranged at a third of the legs.

21. A valve assembly having a basic module and a plurality of valve modules that includes at least three individual valve modules which are mounted on the basic module side by side along a line-up direction, the basic module having a lower portion, an upper portion and a connecting portion connecting the lower and the upper portion which enclose a receiving space for at least one valve module on exactly three sides in a U-shape in a plane perpendicular to the line-up direction, and the lower portion having a bottom surface facing outwards and the upper portion having an upper side facing outwards, at least one external fluid connection and at least one external electrical connection being provided, the at least one external fluid connection being arranged on the bottom surface and the at least one external electrical connection being arranged on the upper side, wherein the valve assembly is configured such that individual valve modules can be detached from the basic module and can be connected therewith without detaching fluidic or electrical lines from the basic module and without having to move or to detach components of the basic module, and wherein a fluid connection face having internal fluid connections is provided on a first side on the lower portion of the basic module facing the receiving space, the fluid connection face being plane and containing all internal fluidic connections, the internal fluid connections being connected with fluid connections of the valve modules, wherein all fluidic connections of the valve modules required for operation are covered by these internal fluidic connections, and wherein internal electrical connections are provided that provide a separate electrical interface for each of the valve modules and that are connected with electrical connections of the valve modules, the internal electrical connections being provided on the connecting portion on a second side of the basic module facing the receiving space, all electrical connections of the valve modules required for operation are covered by these internal electrical connections, so that fluidic and electrical connections are provided on different portions of the basic module and no electrical connections are provided in the lower portion and wherein the first side having the fluid connection face and the second side having the internal electrical connections are arranged perpendicular to each other.

22. A valve assembly having a basic module and a plurality of valve modules that includes at least three individual valve modules which are mounted on the basic module side by side along a line-up direction, the basic module having a lower portion, an upper portion and a connecting portion connecting the lower and the upper portion which enclose a receiving space for at least one valve module on exactly three sides in a plane perpendicular to the line-up direction in a U-shape, and the lower portion having a bottom surface facing outwards and the upper portion having an upper side facing outwards, at least one external fluid connection and at least one external electrical connection being provided, the at least one external fluid connection being arranged on the bottom surface and the at least one external electrical connection being arranged on the upper side, wherein the lower portion and the connecting portion are integrally formed from an L-shaped extruded profile and the upper portion comprises stationary electronic modules fastened to the connecting portion and placed above the valve modules, and wherein a fluid connection face having internal fluid connections is provided on a first side on the lower portion of the basic module facing the receiving space, and wherein internal electrical connections are provided that provide a separate electrical interface for each of the valve modules, the internal electrical connections being provided on the connecting portion on a second side of the basic module facing the receiving space,
wherein the first side having the fluid connection face and the second side having the internal electrical connections are arranged perpendicular to each other and
wherein the valve assembly is configured such that individual valve modules can be detached from the basic module and can be connected therewith without detaching fluidic or electrical lines from the basic module and without having to move or to detach components of the basic module.

* * * * *